(12) United States Patent
Senay et al.

(10) Patent No.: US 10,796,184 B2
(45) Date of Patent: Oct. 6, 2020

(54) METHOD FOR PROCESSING INFORMATION, INFORMATION PROCESSING APPARATUS, AND NON-TRANSITORY COMPUTER-READABLE RECORDING MEDIUM

(71) Applicant: Panasonic Intellectual Property Management Co., Ltd., Osaka (JP)

(72) Inventors: Gregory Senay, Santa Clara, CA (US); Sotaro Tsukizawa, Osaka (JP); Min Young Kim, San Jose, CA (US); Luca Rigazio, Campbell, CA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

(21) Appl. No.: 16/394,062

(22) Filed: Apr. 25, 2019

(65) Prior Publication Data

US 2019/0251383 A1    Aug. 15, 2019

Related U.S. Application Data

(63) Continuation of application No. PCT/JP2017/037937, filed on Oct. 20, 2017.
(Continued)

(51) Int. Cl.
*G06K 9/32* (2006.01)
*G06K 9/00* (2006.01)
(Continued)

(52) U.S. Cl.
CPC ....... *G06K 9/3233* (2013.01); *G06K 9/00805* (2013.01); *G06K 9/6232* (2013.01);
(Continued)

(58) Field of Classification Search
None
See application file for complete search history.

(56) References Cited

U.S. PATENT DOCUMENTS 8,345,984 B2 *  1/2013  Ji .................... G06N 3/0454
                                                    382/190
8,369,652 B1 *  2/2013  Khosla ............ G06K 9/4623
                                                    382/284
(Continued)

OTHER PUBLICATIONS

International Search Report of PCT application No. PCT/JP2017/037937 dated Jan. 16, 2018.
(Continued)

*Primary Examiner* — Fayyaz Alam
(74) *Attorney, Agent, or Firm* — Greenblum & Bernstein, P.L.C.

(57) ABSTRACT

Inputting an image to a neural network, performing convolution on a current frame included in the image to calculate a current feature map, which is a feature map at a present time, combining a past feature map, which is obtained by performing convolution on a past frame included in the image, and the current feature map, estimating an object candidate area using the combined past feature map and current feature map, estimating positional information and identification information regarding the one or more objects included in the current frame using the combined past feature map and current feature map and the estimated object candidate area, and outputting the positional information and the identification information regarding the one or more objects included in the current frame of the image estimated in the estimating as object detection results are included.

8 Claims, 10 Drawing Sheets

Related U.S. Application Data

(60) Provisional application No. 62/419,659, filed on Nov. 9, 2016.

(51) Int. Cl.
| | | |
|---|---|---|
| *G06K 9/62* | (2006.01) | |
| *G06N 3/08* | (2006.01) | |
| *G06T 7/73* | (2017.01) | |
| *G06N 3/04* | (2006.01) | |
| *G06T 7/00* | (2017.01) | |

(52) U.S. Cl.
CPC .............. *G06N 3/04* (2013.01); *G06N 3/0454* (2013.01); *G06N 3/08* (2013.01); *G06T 7/00* (2013.01); *G06T 7/74* (2017.01); *G06T 2207/20084* (2013.01); *G06T 2207/30261* (2013.01)

(56) References Cited

U.S. PATENT DOCUMENTS

| | | | | |
|---|---|---|---|---|
| 8,774,517 | B1* | 7/2014 | Khosla | G06K 9/00993 |
| | | | | 382/190 |
| 9,740,949 | B1* | 8/2017 | Khosla | G06K 9/4623 |
| 2005/0192707 | A1* | 9/2005 | Park | G05D 1/0246 |
| | | | | 700/259 |
| 2017/0262995 | A1* | 9/2017 | Li | G06N 3/0454 |
| 2017/0270653 | A1* | 9/2017 | Garnavi | G06N 20/20 |

OTHER PUBLICATIONS

Shaoqing Ren et al., "Faster R-CNN: Towards Real-Time Object Detection with Region Proposal Networks", International Conference on Computer Vision (ICCV), Jan. 6, 2016.

Forrest N. Iandola et al., "SqueezeNet: AlexNet-level accuracy with 50x fewer parameters and <0.5MB model size", ICLR 2017, arXiv: 1602.07360, Nov. 4, 2016.

Kaiming He et al., "Deep Residual Learning for Image Recognition", The IEEE Conference on Computer Vision and Pattern Recognition (CVPR), Dec. 10, 2015.

Alex Krizhevsky et al., "ImageNet Classification with Deep Convolutional Neural Networks", Part of: Advances in Neural Information Processing Systems 25 (NIPS 2012), Dec. 2012.

The Extended European Search Report dated Oct. 25, 2019 for European Patent Application No. 17870205.6.

Wang Junbin et al: "Real-time pedestrian detection and tracking on customized hardware", 2016 14TH ACM/IEEE Symposium on Embedded Systems for Real-Time Multimedia (Estimedia), ACM, Oct. 6, 2016 (Oct. 6, 2016), p. 1, XP033012207, [retrieved on Nov. 16, 2016].

Joe Yue-Hei Ng et al: "Beyond short snippets: Deep networks for video classification", 2015 IEEE Conference on Computer Vision and Pattern Recognition (CVPR), IEEE, Jun. 7, 2015 (Jun. 7, 2015), pp. 4694-4702, XP032793927, DOI: 10.1109/CVPR.2015.7299101 [retrieved on Oct. 14, 2015].

* cited by examiner

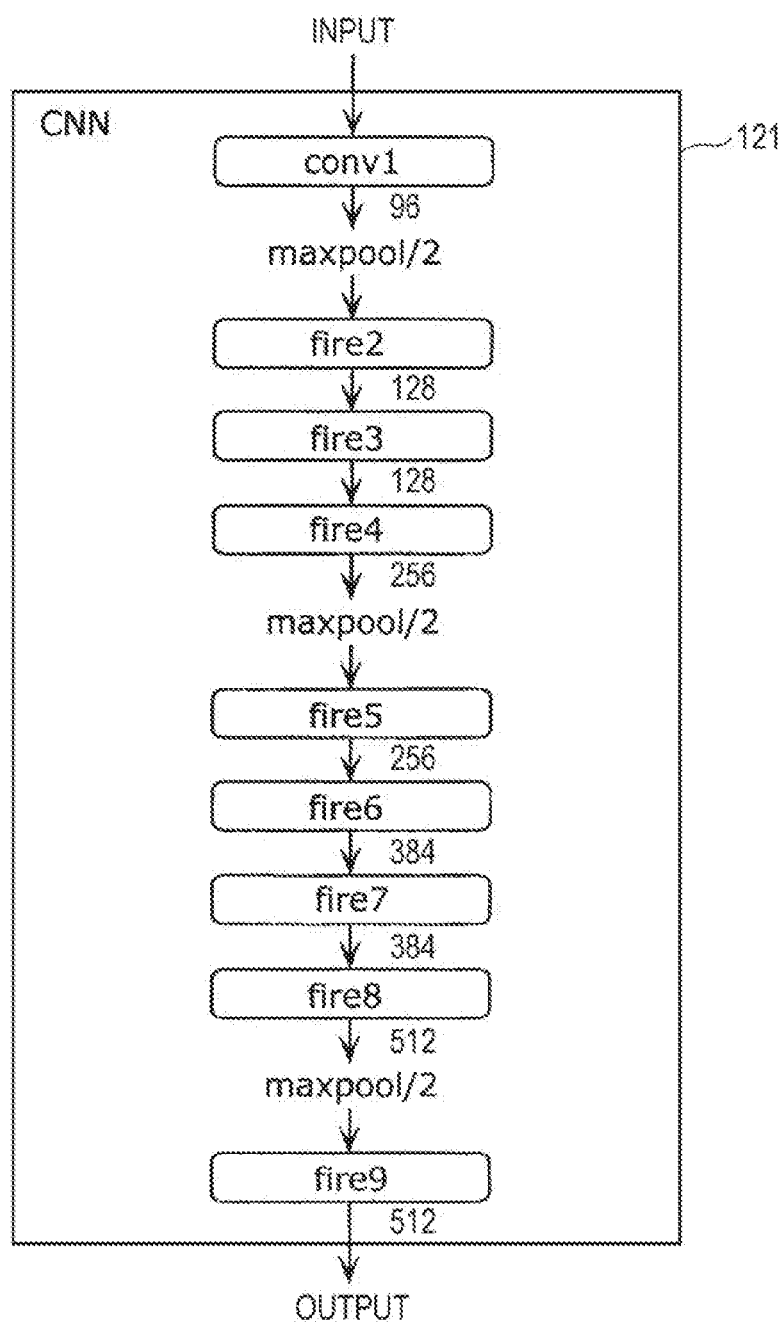

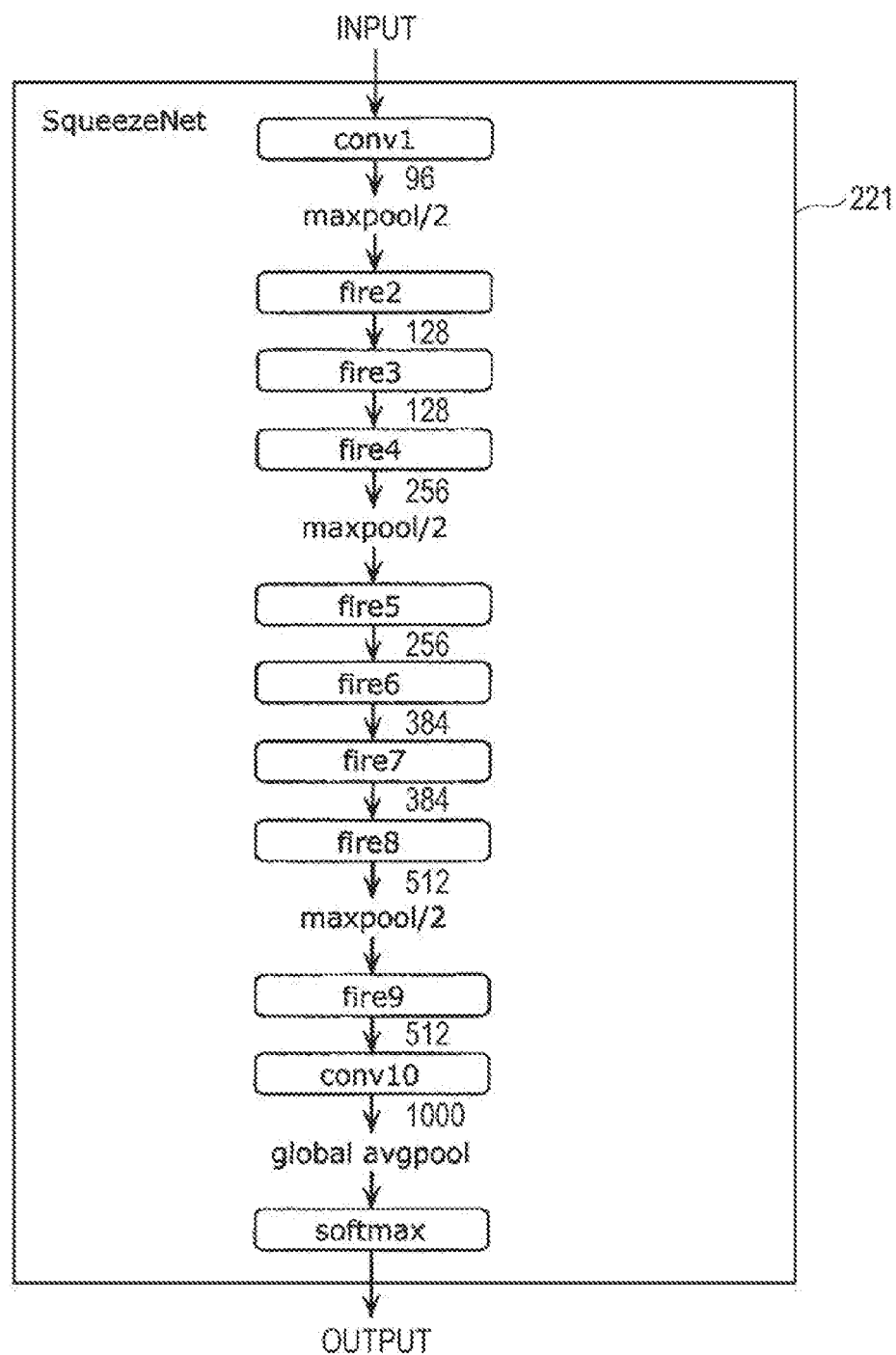

FIG. 11

| CAR | Easy | Moderate | Hard |
|---|---|---|---|
| Mono Frame SQN | 80.47 | 68.63 | 56.43 |
| Multi Frames SQN | 83.23 | 73.31 | 60.06 |
| Mono Frame VGG | 93.96 | 78.67 | 67.94 |
| Multi Frames VGG | 91.93 | 78.32 | 68.23 |

FIG. 12

| PEDESTRIAN | Easy | Moderate | Hard |
|---|---|---|---|
| Mono Frame SQN | 55.07 | 45.53 | 42.75 |
| Multi Frames SQN | 77.41 | 63.46 | 58.32 |
| Mono Frame VGG | 88.09 | 70.30 | 61.99 |
| Multi Frames VGG | 86.43 | 68.86 | 61.58 |

FIG. 13

| CYCLIST | Easy | Moderate | Hard |
|---|---|---|---|
| Mono Frame SQN | 40.95 | 34.90 | 32.87 |
| Multi Frames SQN | 51.59 | 43.29 | 40.54 |
| Mono Frame VGG | 61.51 | 49.67 | 46.18 |
| Multi Frames VGG | 63.22 | 52.95 | 50.15 |

FIG. 14

| PROCESSING SPEED | VGG | SqueezeNet |
|---|---|---|
| Mono Frame | 3.90 fps | 10.75 fps |
| Multi Frames | 3.69 fps | 9.52 fps |

METHOD FOR PROCESSING INFORMATION, INFORMATION PROCESSING APPARATUS, AND NON-TRANSITORY COMPUTER-READABLE RECORDING MEDIUM

BACKGROUND

1. Technical Field

The present disclosure relates to a method for processing information, an information processing apparatus, and a non-transitory computer-readable recording medium and, more particularly, to a method for processing information, an information processing apparatus, and a non-transitory computer-readable recording medium achieved by a computer using a neural network.

2. Description of the Related Art

During these years, efforts toward putting into practice advanced driver assistance systems (ADAS), which are systems for predicting and avoiding potential accidents and the like and autonomous vehicles are being made. A function of detecting obstacles, which detects obstacles on the road, is one of important functions for achieving this goal.

As a technique for achieving the function of detecting obstacles, a technique for detecting objects through deep learning, which detects a plurality of objects included in a moving image, is attracting attention (e.g., Shaoqing Ren and al., "Faster R-CNN: Towards Real-Time Object Detection with Region Proposal Networks", International Conference on Computer Vision (ICCV), 2015, pages 1440-1448). In "Faster R-CNN: Towards Real-Time Object Detection with Region Proposal Networks", Faster-RCNN is used as a convolutional neural network (CNN) for deep learning in order to improve a recognition rate and increase detection speed compared with when regions with CNN features (R-CNN) is used.

SUMMARY

In one general aspect, the techniques disclosed here feature a method for processing information achieved by a computer using a neural network. The method includes inputting an image including one or more objects to the neural network, causing a convolutional layer included in the neural network to perform convolution on a current frame included in the image to calculate a current feature map, which is a feature map at a present time, causing a combining unit for combining two or more feature maps into one feature map to combine a past feature map, which is a feature map obtained by causing the convolutional layer to perform convolution on a past frame included in the image and preceding the current frame, and the current feature map, causing a region proposal network included in the neural network to estimate an object candidate area using the combined past feature map and current feature map, the region proposal network being used to estimate the object candidate area, causing a region of interest pooling layer included in the neural network to estimate positional information and identification information regarding the one or more objects included in the current frame using the combined past feature map and current feature map and the estimated object candidate area, the region of interest pooling layer being used to perform class estimation, and outputting the positional information and the identification information regarding the one or more objects included in the current frame of the image estimated in the causing as object detection results.

With the method for processing information or the like in the present disclosure, processing speed at which a computer detects an object using a neural network further improves.

It should be noted that these general or specific aspects may be implemented as a system, a method, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of the detailed configuration of a CNN illustrated in FIG. 2;

FIG. 4A is a diagram illustrating a network model of SqueezeNet;

FIG. 11 is a diagram illustrating results of an experiment in an example in which a recognition rate of a car class was evaluated using a KITTI MOD dataset;

FIG. 12 is a diagram illustrating results of an experiment in the example in which a recognition rate of a pedestrian class was evaluated using a KITTI MOD dataset;

FIG. 13 is a diagram illustrating results of an experiment in the example in which a recognition rate of a cyclist class was evaluated using a KITTI MOD dataset; and FIG. 14 is a diagram illustrating results of evaluation of processing speed based on the KITTI MOD dataset in the example.

DETAILED DESCRIPTION

Figure 1:
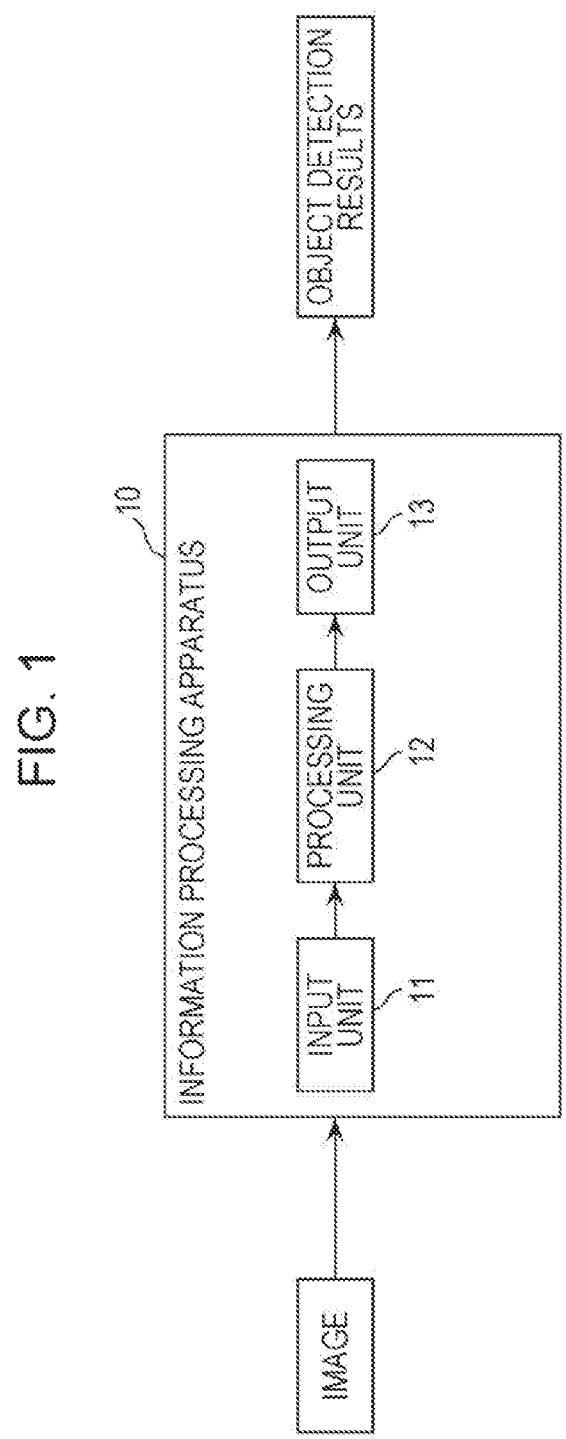
FIG. 1 is a block diagram illustrating an example of the configuration of an information processing apparatus according to an embodiment.

Underlying Knowledge Forming Basis of Present Disclosure

A technique for detecting objects is one of image recognition techniques for recognizing positions and types of objects in images. During these years, techniques for detecting objects through deep learning are attracting attention, and high recognition performance is achieved using a CNN. The techniques for detecting objects through deep learning, however, have a problem in that the techniques generally require a large amount of processing and detection speed is low.

In Shaoqing Ren and al., "Faster R-CNN: Towards Real-Time Object Detection with Region Proposal Networks", International Conference on Computer Vision (ICCV), 2015, pages 1440-1448, a recognition rate is improved and detection speed is increased using Faster-RCNN as a CNN for deep learning. Results of evaluation of the performance of Faster-RCNN and R-CNN were detection speeds of 5 fps and 0.5 fps and recognition rates of 69.9% and 66.9%, respectively. These results were evaluated using pattern analysis, statistical modelling and computational learning visual object classes (Pascal-VOC). In addition, the recognition rates were evaluated as mean average precision (MAP).

The technique for detecting objects employing Faster-RCNN proposed in "Faster R-CNN: Towards Real-Time Object Detection with Region Proposal Networks" thus improves the recognition rate and increases the detection speed compared to when R-CNN is used.

When an automobile is running at 100 km/h, for example, however, the automobile travels about 5.56 m until an object that is an obstacle is detected after the object appears even if the detection speed is 5 fps. That is, the detection speed of 5 fps achieved by the technique for detecting objects employing Faster-RCNN is insufficient for avoidance of a collision with an obstacle.

Since the technique for detecting objects proposed in "Faster R-CNN: Towards Real-Time Object Detection with Region Proposal Networks" does not achieve real-time detection, it is difficult to use the technique for a system that requires real-time object detection, such as ADAS or autonomous driving.

The present disclosure has been established in view of the above circumstance and aims to provide a method for processing information, an information processing apparatus, and a program capable of further improving processing speed at which a computer detects an object using a neural network.

A method for processing information according to an aspect of the present disclosure is a method for processing information achieved by a computer using a neural network. The method includes inputting an image including one or more objects to the neural network, causing a convolutional layer included in the neural network to perform convolution on a current frame included in the image to calculate a current feature map, which is a feature map at a present time, causing a combiner for combining two or more feature maps into one feature map to combine a past feature map, which is a feature map obtained by causing the convolutional layer to perform convolution on a past frame included in the image and preceding the current frame, and the current feature map, causing a region proposal network included in the neural network to estimate an object candidate area using the combined past feature map and current feature map, the region proposal network being used to estimate the object candidate area, causing a region of interest pooling layer included in the neural network to estimate positional information and identification information regarding the one or more objects included in the current frame using the combined past feature map and current feature map and the estimated object candidate area, the region of interest pooling layer being used to perform class estimation, and outputting the positional information and the identification information regarding the one or more objects included in the current frame of the image estimated in the causing as object detection results.

As a result, processing speed at which a computer detects an object using a neural network further improves.

Here, for example, the neural network may include three or more convolutional layers. One of the three or more convolutional layers may be caused to perform convolution on the current frame included in the image to calculate the current feature map. The corresponding ones of the three or more convolutional layers other than the foregoing convolution layer may be caused to perform convolution on the past frame included in the image to calculate the past feature map.

In addition, for example, the neural network may include a convolutional layer. The convolutional layer may be caused to perform convolution on the past frame included in the image to calculate the past feature map and store the past feature map in a memory. When the past feature map and the current feature map are combined with each other, the past feature map stored in the memory and the current feature map obtained by causing the convolutional layer to perform convolution on the current frame included in the image may be combined with each other.

In addition, for example, the convolutional layer may be a network model lighter than a certain network model.

Here, the lighter network model may be a network model whose processing speed at which the computer performs the causing using the neural network is higher than 5 fps.

Furthermore, for example, the lighter network model may be SqueezeNet including a plurality of fire modules, each of which includes a squeeze layer, which is a 1×1 filter, and an expand layer, in which a 1×1 filter and a 3×3 filter are arranged in parallel with each other.

The following embodiment is a specific example of the present disclosure. Values, shapes, components, steps, the order of the steps, and the like mentioned in the following embodiment are examples, and do not limit the present disclosure. Among the components described in the following embodiment, ones not described in independent claims, which define broadest concepts, will be described as arbitrary components. In addition, any embodiment may be combined with another embodiment.

Embodiment

A method for processing information performed by an information processing apparatus 10 and the like according to an embodiment will be described hereinafter with reference to the drawings.

Configuration of Information Processing Apparatus 10

Figure 2:
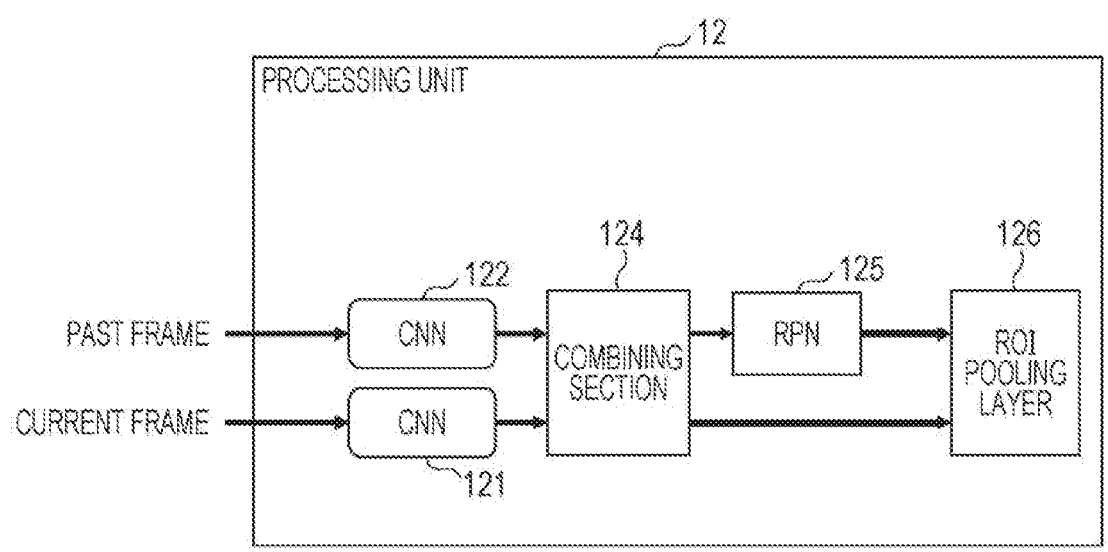
FIG. 2 is a block diagram illustrating an example of the detailed configuration of a processing unit illustrated in FIG. 1.

FIG. 1 is a block diagram illustrating an example of the configuration of the information processing apparatus 10 according to the present embodiment. FIG. 2 is a block diagram illustrating an example of the detailed configuration of a processing unit 12 illustrated in FIG. 1.

The information processing apparatus 10 is achieved by a computer employing a neural network or the like and includes, as illustrated in FIG. 1, an input unit 11, the processing unit 12, and an output unit 13. The information processing apparatus 10 receives an image including one or more objects and outputs object detection results, which include identification information and positional information regarding the objects. The information processing apparatus 10 may output an image to which the object detection results have been added.

Input Unit 11

The input unit 11 inputs an image including one or more objects to the neural network. More specifically, the input unit 11 inputs, to the processing unit 12, a current frame and a past frame that are included in the image including one or more objects and temporally successive to each other. Here, a past frame is a frame preceding a current frame and included in an image. It is to be noted that a past frame need not be one frame, and may be two or more temporally successive frames preceding a current frame. In addition, the two or more temporally successive frames may be any frames temporally successive at time intervals at which the processing unit 12 can detect objects. The time intervals of the successive frames, therefore, may be changed in accordance with objects to be detected, the moving speed of a vehicle camera, or the like.

In the following description of the present embodiment, the input unit 11 inputs a current frame and a past frame, which are two temporally successive images, to the processing unit 12.

Processing Unit 12

The processing unit 12 performs a process for detecting objects, by which positional information and identification information regarding one or more objects included in a current frame of an image, using the neural network in the present disclosure. In the present embodiment, the processing unit 12 includes, as illustrated in FIG. 2, a CNN 121, a CNN 122, a combining section 124, a region proposal network (RPN) 125, and a region of interest (ROI) pooling layer 126. In other words, the neural network in the present disclosure includes the CNN 121, the CNN 122, the combining section 124, the RPN 125, and the ROI pooling layer 126. It is to be noted that the neural network in the present disclosure will be also referred to as Temporal Faster-RCNN.

CNNs 121 and 122

The CNNs 121 and 122 are an example of two or more convolutional layers included in the neural network in the present disclosure and configured by CNNs for calculating feature maps from input images. The convolutional neural networks configuring the CNNs 121 and 122 are the same and share weights. In addition, the convolutional neural networks configuring the CNNs 121 and 122 are learned in advance.

The CNN 121 performs convolution on a current frame included in an image and calculates a current feature map, which is a feature map at the present time. More specifically, the CNN 121 performs convolution on a current frame input from the input unit 11 to calculate a feature map of the current frame.

The CNN 122 performs convolution on a past frame included in an image and preceding a current frame to calculate a past feature map. More specifically, the CNN 121 performs convolution on a past frame input from the input unit 11 to calculate a feature map of the past frame.

Figure 4B:
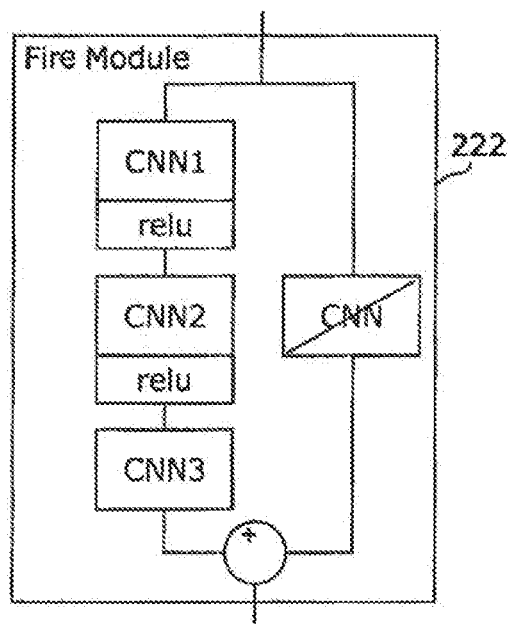
FIG. 4B is a diagram illustrating the configuration of a fire module illustrated in FIG. 4A.

Now, an example of a network model of the convolutional neural networks configuring the CNNs 121 and 122 will be described. FIG. 3 is a diagram illustrating an example of the detailed configuration of the CNN 121 illustrated in FIG. 2. It is to be noted that the detailed configuration of the CNN 122 is the same as in FIG. 3, and description thereof is omitted. FIG. 4A is a diagram illustrating a network model of SqueezeNet, FIG. 4B is a diagram illustrating the configuration of a fire module illustrated in FIG. 4A.

The network model of the convolution neural network configuring the CNN 121 is SqueezeNet including a plurality of fire modules, each of which includes a squeeze layer, which is a 1×1 filter, and an expand layer, in which a 1×1 filter and a 3×3 filter are arranged in parallel with each other. The CNN 121 illustrated in FIG. 3 includes conv1 to fire9, which are a CNN part of SqueezeNet 221 illustrated in FIG. 4A other than an identification layer. As illustrated in FIG. 3, an output of fire9, which is a last layer, is reduced to 512. It is to be noted that details of SqueezeNet are disclosed in landola F. N., and al., "SqueezeNet: AlexNet-level accuracy with 50× fewer parameters and <MB model size", arXiv preprint, arXiv: 1602.07360, 2016.

SqueezeNet includes, as illustrated in FIG. 4A, for example, conv1 and conv10, which are two convolutional layers, maxpool/2, which is three max pooling layers, and fire2 to fire 9, which are eight fire modules.

The eight fire modules each include, as with a fire module 222 illustrated in FIG. 4B, for example, three convolutional layers CNN1, CNN2, and CNN3. CNN1 is called a squeeze layer, which is a 1×1 filter. CNN2 is a 3×3 filter, and CNN3 is a 1×1 filter. CNN2 and CNN3, which are arranged in parallel with each other, together form an expand layer. That is, each fire module includes a squeeze layer and an expand layer.

In each fire module, CNN1, which is the squeeze layer, reduces the number of channels given to CNN2, which is included in the expand layer. CNN1 arranged in parallel with CNN2 can substantially halve the number of channels and reduce the number of channels as many as possible.

It is to be noted that the three max pooling layers are inserted after conv1, fire4, fire8, and conv10 in order to maintain the accuracy of SqueezeNet.

SqueezeNet thus reduces parameters using the fire modules instead of a convolutional layer and configures a highly memory-efficient network. In addition, SqueezeNet can reduce the amount of processing while maintaining accuracy.

For the reason described above, SqueezeNet is used in the present embodiment for the CNN 121 used to calculate a feature map in order to reduce the amount of processing.

It is to be noted that SqueezeNet is an example of a network model lighter than a certain network model used for image recognition. Here, the certain network model is Visual Geometry Group (VGG) or the like used for Faster-RCNN, R-CNN, or the like, for example, and is conventionally a network model of a convolutional neural network used for image recognition. The network model used for the CNN 121, therefore, is not limited to SqueezeNet. Any light network model that makes processing speed at which a computer performs the process for detecting objects using the neural network in the present disclosure faster than 5 fps can be used for the CNN 121. The network model used for the CNN 121 may be, for example, so-called AlexNet or so-called ResidualNet. AlexNet is disclosed in Kaiming He and al., "Deep Residual Learning for Image Recognition", The IEEE Conference on Computer Vision and Pattern Recognition (CVPR), 2016, pp. 770-778, and ResidualNet is disclosed in Alex Krizhevsky and al., "ImageNet Classification with Deep Convolutional Neural Networks", Part of: Advances in Neural Information Processing Systems 25 (NIPS 2012).

Combining Section 124

The combining section 124 combines two or more feature maps into one feature map. More specifically, the combining section 124 combines a past feature map, which has been obtained by performing convolution, using the CNN 122, on a past frame included in an image and preceding a current frame, and a current feature map.

In the present embodiment, areas of a past feature map and a current feature map are connected and combined with each other. In other words, the combining section 124 connects and combines the entirety of areas of feature maps obtained by performing convolution on frames at different times.

The combining section 124 outputs the feature map obtained as a result of the combining to the RPN 125 and the ROI pooling layer 126.

RPN 125

The RPN 125 is a network for estimating an object candidate area. More specifically, the RPN 125 is learned in advance. The RPN 125 performs raster scanning on a feature map in a detection window and outputs a score indicating object likelihood and an area of an object. The RPN 125 can thus simultaneously perform estimation of an object candidate and recognition of an area of the object candidate using a feature map.

In the present embodiment, the RPN 125 estimates an object candidate area using a past feature map and a current feature map combined by the combining section 124. More specifically, the RPN 125 estimates an object candidate area including a score indicating object likelihood and an area of an object in a feature map obtained by connecting the current feature map of a current frame and the past feature map of a past frame.

In addition, the RPN 125 outputs the estimated object candidate area to the ROI pooling layer 126.

ROI Pooling Layer 126

The ROI pooling layer 126 is used to perform class estimation. More specifically, the ROI pooling layer 126 detects an object by performing class identification in an object candidate area through ROI pooling, by which an input is converted into an output of a certain size.

In the present embodiment, the ROI pooling layer 126 estimates positional information and identification information regarding one or more objects included in a current frame using a past feature map and a current feature map combined by the combining section 124 and an object candidate area estimated by the RPN 125.

Output Unit 13

The output unit 13 outputs, as object detection results, positional information and identification information regarding one or more objects included in a current frame of an image estimated by the processing unit 12.

The output unit 13 can thus output, as object detection results, positional information and identification information regarding one or more objects included in an image input to the input unit 11. It is to be noted that the output unit 13 may add the object detection results to the image input to the input unit 11 and output the image.

Operation of Information Processing Apparatus 10

An example of the operation of the information processing apparatus 10 configured as described above will be described hereinafter.

Figure 5:
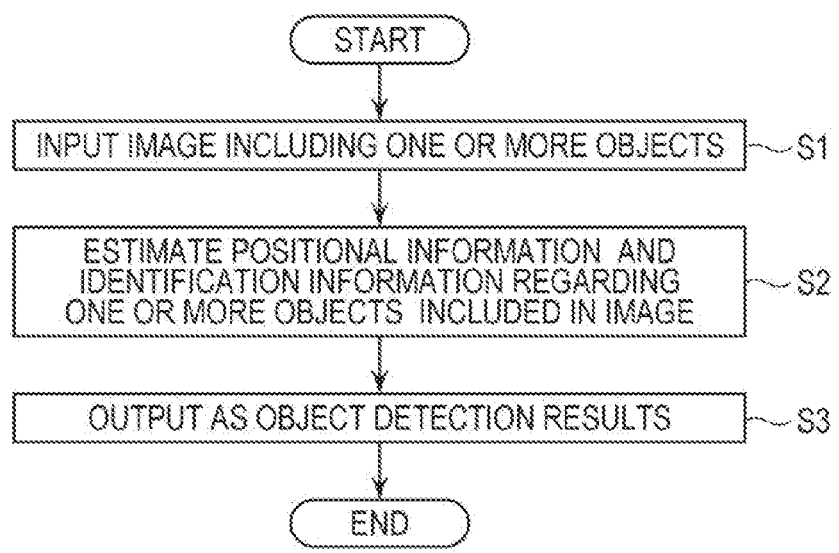
FIG. 5 is a flowchart illustrating a process for detecting objects performed by the information processing apparatus according to the embodiment.
Figure 6:
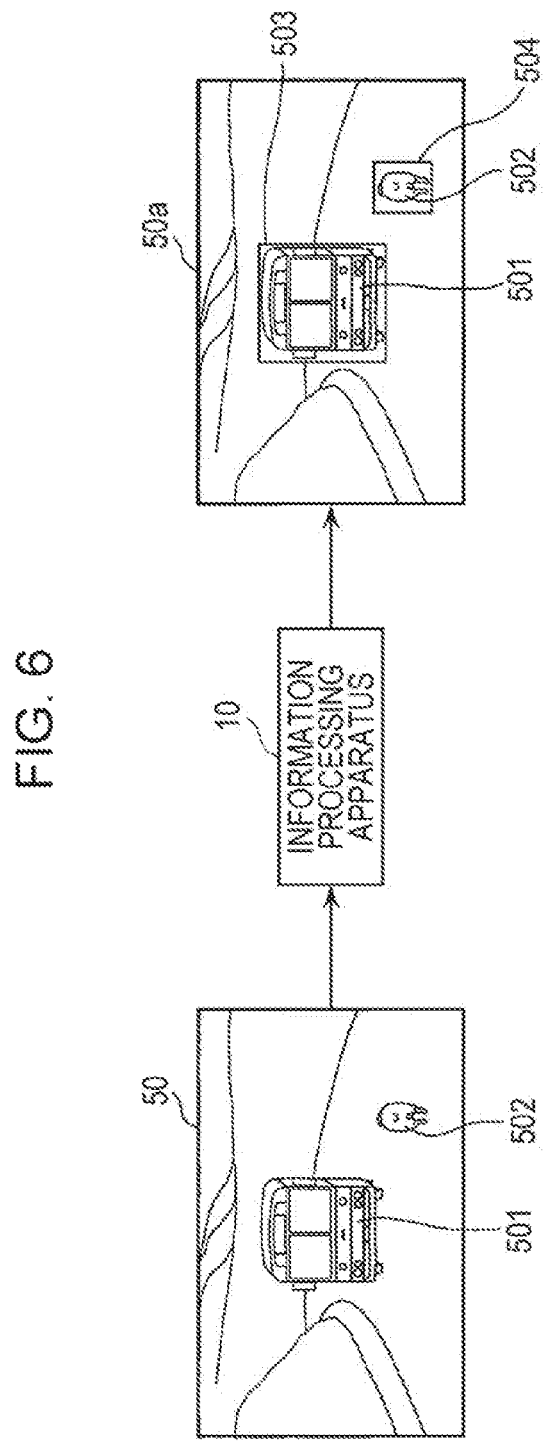
FIG. 6 is a diagram illustrating an example of the process for detecting objects performed by the information processing apparatus according to the embodiment.

FIG. 5 is a flowchart illustrating the process for detecting objects performed by the information processing apparatus 10 according to the present embodiment. FIG. 6 is a diagram illustrating an example of the process for detecting objects performed by the information processing apparatus 10 according to the present embodiment.

First, the information processing apparatus 10 performs an input process, by which an image including one or more objects is input to Temporal Faster-RCNN, which is the neural network in the present disclosure (S1). As illustrated in FIG. 6, for example, the information processing apparatus 10 inputs an image 50 including objects 501 and 502 to Temporal Faster-RCNN.

Next, the information processing apparatus 10 performs the process for detecting objects, by which positional information and identification information regarding the one or more objects included in the image are estimated (S2), and an output process, by which the positional information and the identification information are output as object detection results (S3). As illustrated in FIG. 6, for example, the information processing apparatus 10 outputs, as object detection results, an image 50a to which frames 503 and 504 indicating positions of the objects 501 and 502 and identification information indicating that the object 501 is a vehicle and the object 502 is an animal are added.

Figure 7:
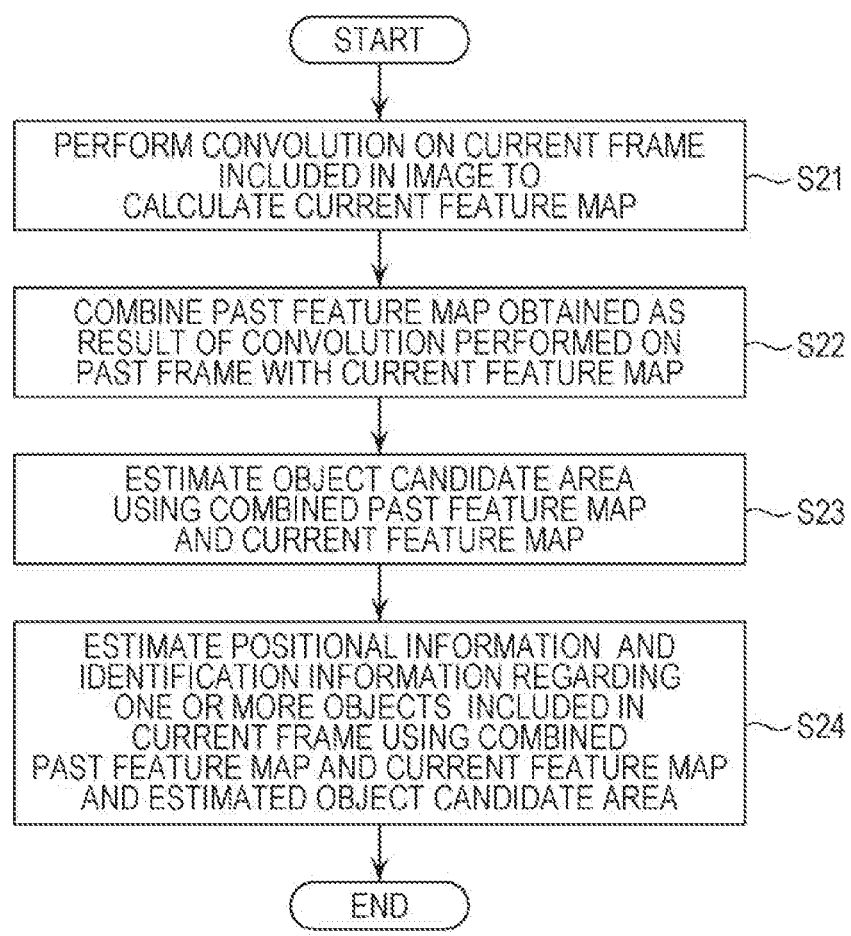
FIG. 7 is a flowchart illustrating details of a process for detecting objects in step S2 illustrated in FIG. 5.
Figure 8:
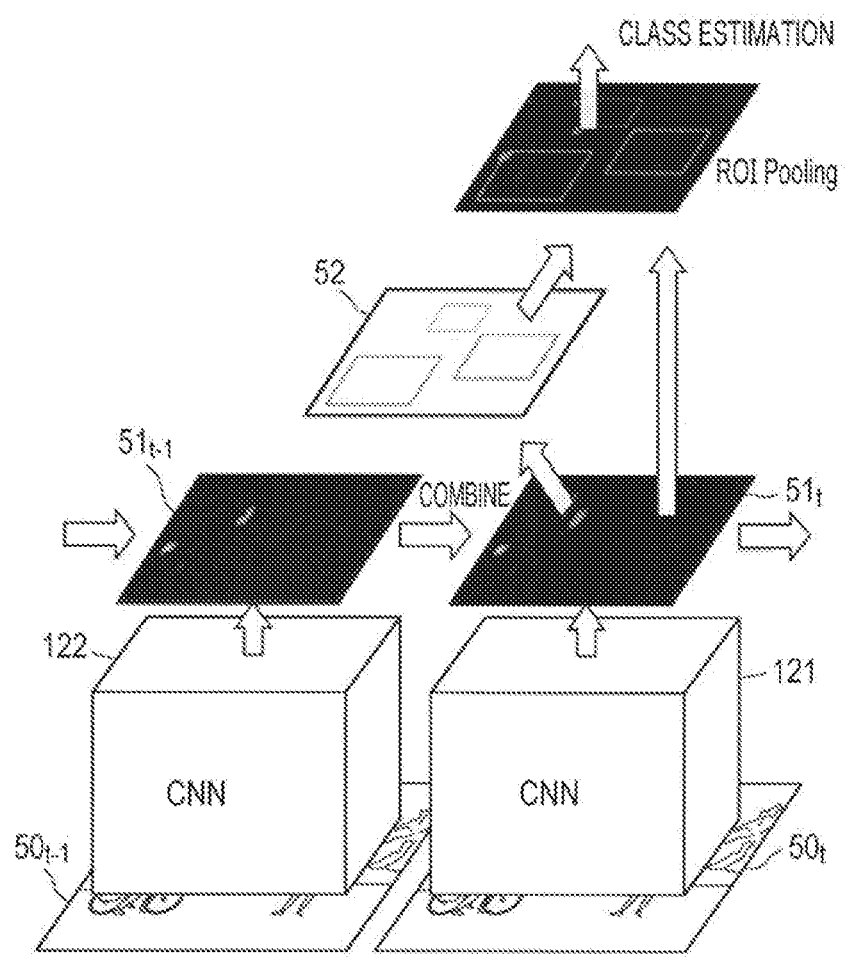
FIG. 8 is a diagram schematically illustrating details of the process for detecting objects according to the embodiment.

FIG. 7 is a flowchart illustrating details of the process for detecting objects in step S2 illustrated in FIG. 5. FIG. 8 is a diagram conceptually illustrating details of the process for detecting objects according to the present embodiment.

In step S2, first, the information processing apparatus 10 performs convolution on a current frame included in the image to calculate a current feature map (S21). More specifically, the information processing apparatus 10 performs convolution on a current frame and a past frame included in the image to calculate a current feature map and a past feature map. In the example illustrated in FIG. 8, the information processing apparatus 10 causes the CNN 121 to perform convolution on a current frame $50_t$ to calculate a current feature map $51_t$, which is a feature map at the present time. In addition, the information processing apparatus 10 causes the CNN 122 to perform convolution on a past frame $50_{t-1}$, which precedes the current frame $50_t$, to calculate a past feature map $51_{t-1}$, which is a feature map in the past.

Next, the information processing apparatus 10 combines the past feature map, which has been obtained by performing the convolution on the past frame, and the current feature map (S22). In the example illustrated in FIG. 8, the information processing apparatus 10 causes the combining section 124 to connect the current feature map $51_t$ and the past feature map $51_{t-1}$ to combine the current feature map $51_t$ and the past feature map $51_{t-1}$. The information processing apparatus 10 then causes the combining section 124 to output a feature map obtained by combining the current feature map $51_t$ and the past feature map $51_{t-1}$ to the RPN 125 and the ROI pooling layer 126.

Next, the information processing apparatus 10 estimates an object candidate area using the combined past feature map and current feature map (S23). In the example illustrated in FIG. 8, the information processing apparatus 10 causes the RPN 125 to estimate an object candidate area 52 including a score indicating object likability and an area of an object using the feature map obtained by combining the past feature map $51_{t-1}$ and the current feature map $51_t$.

Next, the information processing apparatus 10 estimates positional information and identification information regarding the one or more objects included in the current frame using the combined past feature map and current feature map and the estimated object candidate area (S24). In the example illustrated in FIG. 8, the information processing apparatus 10 causes the ROI pooling layer 126 to perform class identification in the object candidate area 52 using the feature map obtained by combining the past feature map $51_{t-1}$ and the current feature map $51_t$ to estimate the positional information and the identification information regarding the one or more objects included in the current frame.

Advantageous Effects, Etc.

In object detection through deep learning, calculation of a feature map is a key issue in terms of the amount of processing. The amount of processing in the calculation of a feature map can be reduced by using SqueezeNet, which is a network model lighter than the certain network model generally used for image recognition, such as VGG, for a convolutional neural network for calculating a feature map.

Because a calculated feature map includes information regarding a candidate position of an object and a type of object, on the other hand, the feature map greatly affects recognition performance. That is, recognition performance significantly decreases if the weight of a convolutional neural network for calculating a feature map is reduced using SqueezeNet or the like. The decrease in recognition performance, therefore, is suppressed while maintaining the amount of processing by simultaneously using chronological information, that is, information regarding a past frame and information regarding a current frame, for recognition. More specifically, an attempt to improve recognition performance while maintaining the amount of processing is made by using a feature map calculated in object detection performed on a past frame for object detection performed on a current frame.

The information processing apparatus 10 according to the present embodiment includes the CNNs 121 and 122 to which a light network model such as SqueezeNet is used and uses a past feature map of a past frame and a current feature map of a current frame for object detection performed on the current frame.

During learning, the CNNs 121 and 122 are caused to calculate a feature map for every frame used. During detection, on the other hand, the CNN 121 may calculate only a feature map of a current frame. A feature map of a past frame may be calculated and held by the CNN 122 when the past frame was a current frame. As a result, the amount of processing during learning significantly increases depending on the number of past frames used, but the amount of processing during detection hardly increases.

The amount of processing can thus be reduced by using a light network model such as SqueezeNet for the calculation of a feature map. Recognition performance that decreases as a result of this is improved by using feature maps of multiple frames, that is, feature maps of a current frame and a past frame. That is, even when the weight of the process for calculating a feature map is reduced, a decrease in a recognition rate can be suppressed.

As described above, with the information processing apparatus 10 according to the present embodiment, processing speed at which a computer detects an object using a neural network further improves. As a result, the information processing apparatus 10 according to the present embodiment can be used for a system that requires real-time object detection, such as ADAS or autonomous driving.

It is to be noted that a partly hidden object, such as a pedestrian whose body is largely hidden behind a parked vehicle, cannot be detected when a feature map of a single frame, such as a still image, is used. Since the information processing apparatus 10 according to the present embodiment uses feature maps of multiple frames, such as a moving image, on the other hand, a partly hidden object, such as a pedestrian whose body is largely hidden behind a parked vehicle, can be detected.

First Modification

Although the processing unit 12 includes the CNNs 121 and 122, that is, two convolutional neural networks for calculating feature maps from input images, in the above embodiment, the number of convolutional neural networks included is not limited to this. The processing unit 12 may include only one convolutional neural network for calculating feature maps, instead. Difference between this case, which is a first modification, and the embodiment will be mainly described hereinafter.

Configuration of Processing Unit 12A

Figure 9:
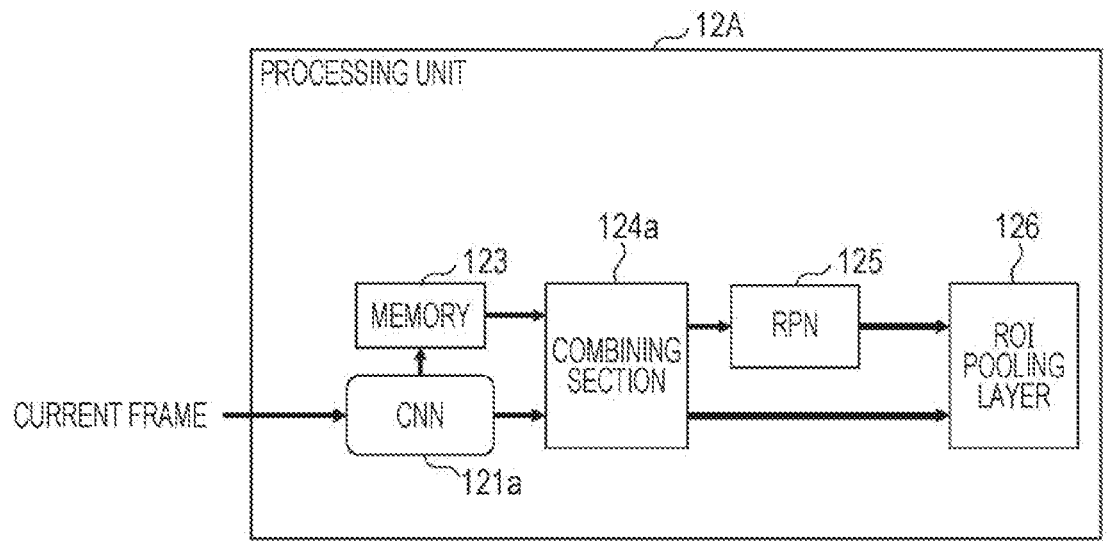
FIG. 9 is a block diagram illustrating an example of the detailed configuration of a processing unit according to a first modification.

FIG. 9 is a block diagram illustrating an example of the detailed configuration of a processing unit 12A according to the first modification. The same components as in FIG. 2 are given the same reference numerals, and detailed description thereof is omitted.

As illustrated in FIG. 9, the processing unit 12A includes a CNN 121a, a memory 123, a combining section 124a, the RPN 125, and the ROI pooling layer 126. The processing unit 12A is different from the processing unit 12 according to the embodiment in that the memory 123 is added and only the CNN 121a, which is a sole convolutional network, is included. In other words, the neural network in the present disclosure may include the CNN 121a, the memory 123, the combining section 124a, the RPN 125, and the ROI pooling layer 126.

Memory 123

The memory 123 is configured by a hard disk, a semiconductor memory, or the like and stores information. In the present embodiment, the memory 123 stores past feature maps of past frames calculated by the CNN 121a.

CNN 121a

The CNN 121a is an example of a convolutional layer included in the neural network in the present disclosure and calculates a feature map from an input image. The CNN 121a performs convolution on a past frame included in an image to calculate a past feature map. The CNN 121a then stores the calculated past feature map in the memory 123. More specifically, the CNN 121a performs convolution on a past frame input from the input unit 11 to calculate a feature map of the past frame and stores the feature map in the memory 123.

In addition, the CNN 121a performs convolution on a current frame included in an image to calculate a current feature map, which is a feature map at the present time. More specifically, the CNN 121a performs convolution on a current frame input from the input unit 11 to calculate a feature map of the current frame.

In addition, a network model of the neural network configuring the CNN 121a is, as described above, a network model, such as SqueezeNet, lighter than the certain network used for image recognition. It is to be noted that details are as described above, and description thereof is omitted.

Combining Section 124a

As illustrated in FIG. 9, the combining section 124a combines a past feature map stored in the memory 123 and a current feature map obtained by, using the CNN 121a, performing convolution on a current frame included in an image. Other features are as described above, and description thereof is omitted.

It is to be noted that other components and operations of the information processing apparatus according to the present modification are the same as those of the information processing apparatus 10 according to the embodiment.
Advantageous Effects, Etc.

With the information processing apparatus according to the present modification, since the memory 123 and the CNN 121a that is a light network model such as SqueezeNet are included, a past feature map of a past frame and a current feature map of a current frame can be used to detect an object in the current frame.

A feature map of a current frame at a time T−1 is thus saved to the memory 123. The feature map is then used as a feature map of a past frame at a time T along with a feature map of a current frame at the time T.

As described above, with the information processing apparatus according to the present modification, a decrease in a recognition rate can be suppressed even when the weight of the process for calculating a feature map is reduced. Processing speed at which a computer detects an object using a neural network, therefore, further improves.

Second Modification

Figure 10:
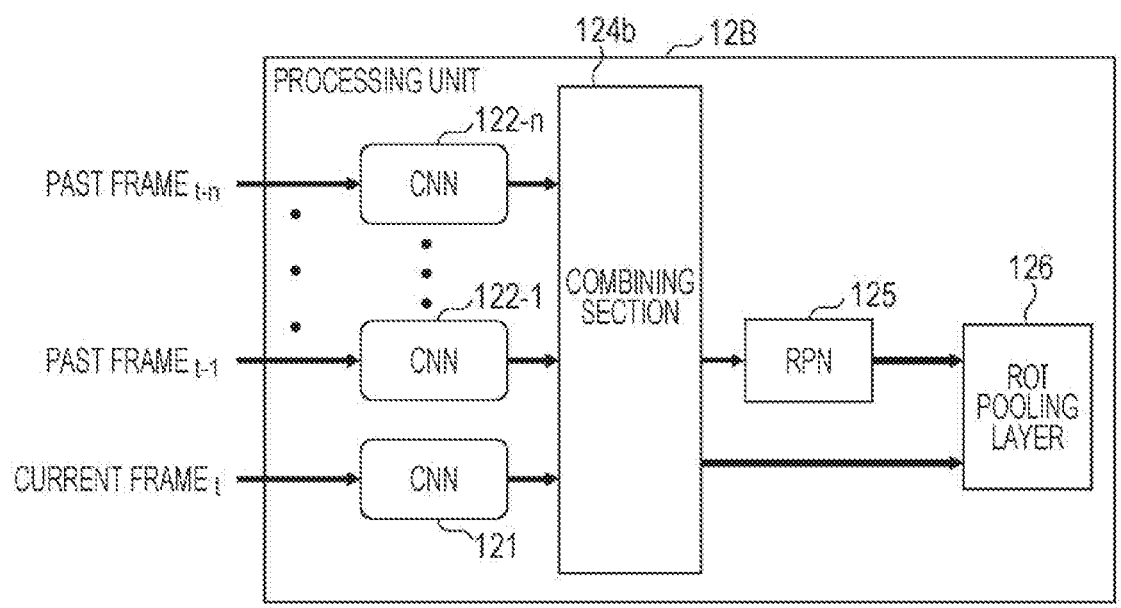
FIG. 10 is a block diagram illustrating an example of the detailed configuration of a processing unit according to a second modification.

Although an example in which feature maps of two frames, namely a current frame and a past frame, are used as an example of feature maps of multiple frames used to detect an object in a current frame has been described in the above embodiment, feature maps used are not limited to these. Feature maps of a current frame and two or more past frames may be used, instead. Difference between this case, which is a second modification, and the embodiment will be mainly described hereinafter.
Configuration of Processing Unit 12B FIG. 10 is a block diagram illustrating an example of the detailed configuration of a processing unit 12B according to the second modification. The same components as in FIG. 2 are given the same reference numerals, and detailed description thereof is omitted.

As illustrated in FIG. 10, the processing unit 12B includes the CNN 121, CNNs 122-1 to 122-n, a combining section 124b, the RPN 125, and the ROI pooling layer 126. Here, n is a natural number equal to or larger than 2. The configuration of the processing unit 12B is different from that of the processing unit 12 according to the embodiment in that a plurality of CNNs 122, namely the CNN 122-1 to 122-n, are included. In other words, the neural network in the present disclosure may include the CNN 121, the CNNs 122-1 to 122-n, the combining section 124b, the RPN 125, and the ROI pooling layer 126.
CNN 121 and CNNs 122-1 to 122-n The CNN 121 and the CNNs 122-1 to 122-n are an example of three or more convolutional layers included in the neural network in the present disclosure and calculate feature maps from input images.

The CNN 121 is one of the three or more convolutional layers and performs convolution on a current frame to calculate a current feature map.

The CNNs 122-1 to 122-n, on the other hand, are the three or more convolutional layers other than the foregoing convolutional layer. The CNNs 122-1 to 122-n perform convolution on corresponding past frames $_{t-1}$ to $_{t-n}$ to calculate past feature maps.

As described above, a network model of neural networks configuring the CNN 121 and the CNNs 122-1 to 122-n is a network model, such as SqueezeNet, lighter than the certain network model used for image recognition. Details are as described above, and description thereof is omitted.

Combining Section 124b

As illustrated in FIG. 10, the combining section 124b combines past feature maps of the past frames $_{t-1}$ to $_{t-n}$ calculated by the CNNs 122-1 to 122-n and a current feature map of the current frame $_t$ calculated by the CNN 121. Other features are as described above, and description thereof is omitted.

It is to be noted that other components and operations of the information processing apparatus according to the present modification are the same as those of the information processing apparatus 10 according to the embodiment.

Advantageous Effects, Etc.

A past feature map to be combined with a current feature map thus need not necessarily be obtained from a single past frame but may be obtained from two or more past frames.

With the information processing apparatus according to the present modification, since the CNN 121 and the CNNs 122-1 to 122-n for which a light network model such as SqueezeNet is used are included, past feature maps of two or more past frames and a current feature map of a current frame can be used to detect an object in the current frame.

As described above, with the information processing apparatus according to the present modification, a decrease in a recognition rate can be suppressed even when the weight of the process for calculating a feature map is reduced. Processing speed at which a computer detects an object using a neural network, therefore, further improves.

Example

The effectiveness of Temporal Faster-RCNN, which is a neural network used for the information processing apparatus 10, was verified. Results of experiments will now be described as an example.

In this example, the performance of the neural network used for the information processing apparatus 10 was evaluated using a KITTI MOD dataset. Results of the evaluation will be described.
KITTI MOD Dataset The KITTI MOD dataset is a multiple object detection benchmark dataset employing images including actual objects. The images included images of urban areas, suburban areas, and expressways. The images included up to 15 vehicles and 30 pedestrians, and there were 7,481 learning images and 7,518 test images. In addition, 80,256 labeled objects were included in the dataset.

The experiments were conducted using 3,682 miniature learning images and 3,799 miniature test images obtained by dividing data provided as the learning images. In addition, the experiments were conducted for three types of object, namely cars, pedestrians, and cyclists, whose detection priority was high as obstacles on the road.
Experiment Conditions The experiments were conducted with the following parameters. That is, the experiments were conducted with a learning rate of 0.005, a learning rate step of 0.1 after 30,000 iterations, a raining input scales of [400, 600, 800, 1000], a maximum width of 2,000, and a testing scale of 600. A multiple frame use condition was that a current frame and past three frames be used.

In the experiments, whether the amount of processing could be reduced and a high recognition rate could be maintained was evaluated when multiple frame SqueezeNet was used to calculate feature maps.

Experiment Results

FIG. 11 is a diagram illustrating results of an experiment in this example in which a recognition rate of a car class was evaluated using the KITTI MOD dataset. FIG. 12 is a diagram illustrating results of an experiment in this example in which a recognition rate of a pedestrian class was evaluated using the KITTI MOD dataset. FIG. 13 is a diagram illustrating results of an experiment in this example in which a recognition rate of a cyclist class was evaluated using the KITTI MOD dataset. The recognition rates were MAP, and a unit thereof was %.

It is to be noted that, in FIGS. 11 to 13, "Mono Frame" indicates a single frame, and "Multi Frames" indicates multiple frames. "SQN" indicates SqueezeNet, and "VGG" indicates VGG-16. In addition, "Easy", "Moderate", and "Hard" are labels indicating degrees of difficulty of detection. These labels indicating the degrees of difficulty of detection are given to the KITTI MOD dataset in advance. In addition, in FIGS. 11 to 13, "Multi Frames SQN" corresponds to the neural network used to calculate feature maps in Temporal Faster-RCNN in the present disclosure. In addition, "Mono Frame VGG" corresponds to a neural network in a comparative example and a neural network used to calculate feature maps in Faster-RCNN.

As illustrated in FIGS. 11 to 13, the recognition rate of "Multi Frames SQN" improved from that of "Mono Frame SQN" under every condition. When the degree of difficulty of detection was "Moderate", for example, the recognition rate significantly improved, namely +18% for the pedestrian class and +9% for the cyclist class, as illustrated in FIGS. 12 and 13. As illustrated in FIG. 11, on the other hand, the improvement in the recognition rate was smaller for the car class, namely +4.68%, than for the other classes. This could be because the moving speed of cars was higher than that of pedestrians or cyclists, and the amount of movement between frames was too large for the KITTI MOD dataset of 10 fps.

In addition, as illustrated in FIG. 11, the recognition rate of "Multi Frames VGG" improved from that of "Mono Frame VGG" when the degree of difficulty of detection was "Hard" for the car class. The recognition rate slightly decreased for the other classes. This could be because VGG-16 was a huge network and sufficient learning was not performed with the data size of miniature learning images used in the experiments.

FIG. 14 is a diagram illustrating results of evaluation of processing speed based on the KITTI MOD dataset in the example. It is to be noted that the processing speed was evaluated using a graphics processing unit (GPU) of NVIDIA GeForce GTX 1080.

As illustrated in FIG. 14, the processing speed of "Multi Frames SQN" was about 2.4 times higher than that of "Mono Frame VGG". When "Mono Frame" and "Multi Frames" were compared, the amount of memory used increased by just about 6%, which meant that there was no significant practical effect upon memory size.

It was found from the above results of the experiments that Temporal Faster-RCNN, which was the neural network in the present disclosure indicated by "Multi Frames SQN", achieved a processing speed about 2.4 times higher than Faster-RCNN indicated by "Mono Frame VGG" while suppressing a decrease in the recognition rate to 3.7% to 10%.

In addition, compared with a case in which a VGG-16 part of Faster-RCNN, which was a simple method for increasing processing speed, was replaced by SqueezeNet, it was found that the recognition rate was improved by 7.7% to 17.9% with an increase in the amount of processing of 12.9% by using multiple frames.

As described above, with the information processing apparatus and the method for processing information in the present disclosure, processing speed at which a computer detects an object using a neural network further improves. The information processing apparatus and the method for processing information in the present disclosure, therefore, can be safely used for a system that requires real-time object detection, such as ADAS or autonomous driving.

Other Potential Applications

Although the method for processing information in the present disclosure has been described above as the embodiment, components and apparatuses that perform the processes are not particularly limited. A processor or the like (described later) incorporated into a certain locally provided apparatus may perform the processes, instead. Alternatively, a cloud server or the like provided in a place different from a place where a local apparatus is provided may perform the processes.

It should be understood that the present disclosure is not limited to the above embodiment. Components described herein may be arbitrarily combined with each other to form an embodiment of the present disclosure, or another embodiment achieved by excluding some of the components may be seen as an embodiment of the present disclosure. In addition, the present disclosure also includes modifications obtained by modifying the embodiment in various manners conceivable by those skilled in the art without deviating from the scope of the present disclosure, that is, concepts defined by the claims.

In addition, the present disclosure further includes the following cases.

(1) The above-described apparatus is specifically a computer system including a microprocessor, a read-only memory (ROM), a random-access memory (RAM), a hard disk unit, a display unit, a keyboard, a mouse, and the like. The RAM or the hard disk unit stores a computer program. When the microprocessor operates in accordance with the computer program, each apparatus achieves functions thereof. Here, the computer program is configured by combining a plurality of instruction codes for issuing commands to a computer.

(2) Some or all of the components included in the apparatus may be configured by a single system large scale integration (LSI) circuit. The system LSI circuit is a super-multifunctional LSI circuit fabricated by integrating a plurality of components on a single chip and, more specifically, a computer system configured by including a microprocessor, a ROM, a RAM, and the like. The RAM stores a computer program. When the microprocessor operates in accordance with the computer program, the system LSI circuit achieves functions thereof.

(3) Some or all of the components included in the apparatus may be configured by an integrated circuit (IC) card or a separate module removably attached to each apparatus. The IC card or the module is a computer system including a microprocessor, a ROM, a RAM, and the like. The IC card or the module may include the super-multifunctional LSI circuit. When the microprocessor operates in accordance with the computer program, the IC card or the module achieves functions thereof. The IC card or the module may be tamper-resistant.

(4) In addition, the present disclosure may be the above-described method. In addition, the present disclosure may be a computer program that achieves the method using a computer, or may be a digital signal including the computer program.

(5) In addition, the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. In addition, the present disclosure may be the digital signal stored in the recording medium.

In addition, the present disclosure may be the computer program or the digital signal transmitted through an electrical communication line, a wireless or wired communication line, a network typified by the Internet, datacasting, or the like.

In addition, the present disclosure may be a computer system including a microprocessor and a memory. The memory may store the compute program, and the microprocessor may operate in accordance with the computer program.

In addition, the present disclosure may be implemented by another independent computer system by recording the program or the digital signal on the recording medium and transporting the recording medium or by transporting the program or the digital signal through the network or the like.

The present disclosure can be used for a method for processing information, an information processing apparatus, and a program employing deep learning and, more particularly, for a system that requires real-time objection detection, such as ADAS or autonomous driving.

What is claimed is:

1. A method for processing information achieved by a computer using a neural network, the method comprising:
    inputting an image including one or more objects to the neural network;
    causing a convolutional layer included in the neural network to perform convolution on a current frame included in the image to calculate a current feature map; which is a feature map at a present time;
    causing a combiner for combining two or more feature maps into one feature map to combine a past feature map, which is a feature map obtained by causing the convolutional layer to perform convolution on a past frame included in the image and preceding the current frame, and the current feature map;
    causing a region proposal network included in the neural network to estimate an object candidate area using the combined past feature map and current feature map, the region proposal network being used to estimate the object candidate area;
    causing a region of interest pooling layer included in the neural network to estimate positional information and identification information regarding the one or more objects included in the current frame using the combined past feature map and current feature map and the estimated object candidate area, the region of interest pooling layer being used to perform class estimation; and
    outputting the positional information and the identification information regarding the one or more objects included in the current frame of the image estimated in the causing as object detection results.

2. The method according to claim 1,
    wherein the neural network includes three or more convolutional layers,
    wherein one of the three or more convolutional layers is caused to perform convolution on the current frame included in the image to calculate the current feature map, and
    wherein the corresponding ones of the three or more convolutional layers other than the foregoing convolution layer are caused to perform convolution on the past frame included in the image to calculate the past feature map.

3. The method according to claim 1,
    wherein the neural network includes a convolutional layer,
    wherein the convolutional layer is caused to perform convolution on the past frame included in the image to calculate the past feature map and store the past feature map in a memory, and
    wherein, when the past feature map and the current feature map are combined with each other, the past feature map stored in the memory and the current feature map obtained by causing the convolutional layer to perform convolution on the current frame included in the image are combined with each other.

4. The method according to claim 1,
    wherein the convolutional layer is a network model lighter than a certain network model.

5. The method according to claim 4,
    wherein the lighter network model is a network model whose processing speed at which the computer performs the causing using the neural network is higher than 5 fps.

6. The method according to claim 4,
    wherein the lighter network model is SqueezeNet including a plurality of fire modules, each of which includes a squeeze layer, which is a 1×1 filter, and an expand layer, in which a 1×1 filter and a 3×3 filter are arranged in parallel with each other.

7. A non-transitory computer-readable recording medium storing a program for causing a computer to perform operations comprising:
    inputting an image including one or more objects to a neural network;
    causing a convolutional layer included in the neural network to perform convolution on a current frame included in the image to calculate a current feature map, which is a feature map at a present time;
    causing a combiner for combining two or more feature maps into one feature map to combine a past feature map, which is a feature map obtained by causing the convolutional layer to perform convolution on a past frame included in the image and preceding the current frame, and the current feature map;
    causing a region proposal network included in the neural network to estimate an object candidate area using the combined past feature map and current feature map, the region proposal network being used to estimate the object candidate area;
    causing a region of interest pooling layer included in the neural network to estimate positional information and identification information regarding the one or more objects included in the current frame using the combined past feature map and current feature map and the estimated object candidate area, the region of interest pooling layer being used to perform class estimation; and
    outputting the positional information and the identification information regarding the one or more objects included in the current frame of the image estimated in the causing as object detection results.

8. An information processing apparatus achieved by a computer using a neural network, the information processing apparatus comprising:

an inputter that inputs an image including one or more objects to the neural network;

a processor that causes a convolutional layer included in the neural network to perform convolution on a current frame included in the image to calculate a current feature map, which is a feature map at a present time, that causes a combiner for combining two or more feature maps into one feature map to combine a past feature map, which is a feature map obtained by causing the convolutional layer to perform convolution on a past frame included in the image and preceding the current frame, and the current feature map, that causes a region proposal network included in the neural network to estimate an object candidate area using the combined past feature map and current feature map, the region proposal network being used to estimate the object candidate area, and that causes a region of interest pooling layer included in the neural network to estimate positional information and identification information regarding the one or more objects included in the current frame using the combined past feature map and current feature map and the estimated object candidate area, the region of interest pooling layer being used to perform class estimation; and an outputter that outputs the positional information and the identification information regarding the one or more objects included in the current frame of the image estimated by the processor as object detection results.

* * * * *